United States Patent
Liu et al.

(10) Patent No.: US 9,512,328 B2
(45) Date of Patent: Dec. 6, 2016

(54) METHOD AND SYSTEM FOR MAGNETIC PARTICLE ASSISTED ADD-ON MODULE ON INKJET PRINTER TO PREVENT INK FROM SETTLING

(71) Applicant: XEROX CORPORATION, Norwalk, CT (US)

(72) Inventors: Yu Liu, Mississauga (CA); Yiliang Wu, Oakville (CA)

(73) Assignee: XEROX CORPORATION, Norwalk, CT (US)

(*) Notice: Subject to any disclaimer, the term of this patent is extended or adjusted under 35 U.S.C. 154(b) by 638 days.

(21) Appl. No.: 13/973,824

(22) Filed: Aug. 22, 2013

(65) Prior Publication Data
US 2015/0053112 A1 Feb. 26, 2015

(51) Int. Cl.
*B41J 2/175* (2006.01)
*B41J 2/21* (2006.01)
*C09D 11/38* (2014.01)
*C09D 11/322* (2014.01)

(52) U.S. Cl.
CPC ............... *C09D 11/38* (2013.01); *B41J 2/175* (2013.01); *B41J 2/2107* (2013.01); *C09D 11/322* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................................... 347/95–105
See application file for complete search history.

(56) References Cited

U.S. PATENT DOCUMENTS

| | | | | |
|---|---|---|---|---|
| 6,726,759 B2* | 4/2004 | McElligott | ........... | C09D 11/322 106/31.65 |
| 6,764,859 B1* | 7/2004 | Kreuwel | ............. | B01F 13/0809 209/217 |
| 7,517,457 B2* | 4/2009 | Siddiqi | ............... | B01F 13/0809 209/217 |
| 7,643,776 B2 | 1/2010 | Walton et al. | | |
| 2004/0104959 A1* | 6/2004 | Brown | ................. | B41J 2/16552 347/22 |
| 2012/0262520 A1* | 10/2012 | Baldwin | .............. | B41J 2/17593 347/56 |

* cited by examiner

*Primary Examiner* — Manish S Shah
(74) *Attorney, Agent, or Firm* — Pillsbury Winthrop Shaw Pittman LLP

(57) ABSTRACT

An ink jet printing system comprises an ink reservoir, an ink passageway, an inkjet nozzle, and a plurality of magnetic elements that are located adjacent at least one of the ink reservoir and the ink passageway. The at least one of the ink reservoir and the ink passageway further includes having micro-magnetic particles located therein. The magnetic particles may have a particle size from about 500 nm to about 50 microns. The ink reservoir and ink passageway further contain ink composition comprising pigment colorant. The plurality of magnetic elements provide a magnetic field to be applied to the micro-magnetic particles which results in a chaotic motion of the magnetic particles in the ink mixture.

19 Claims, 4 Drawing Sheets

METHOD AND SYSTEM FOR MAGNETIC PARTICLE ASSISTED ADD-ON MODULE ON INKJET PRINTER TO PREVENT INK FROM SETTLING

CROSS-REFERENCE TO RELATED APPLICATIONS

Reference is made to commonly owned and co-pending, U.S. patent application Ser. No. 13/860,466 entitled "METHOD AND SYSTEM FOR MAGNETIC ACTUATED MIXING" to Yu Liu et al., filed Apr. 10, 2013; and commonly owned and co-pending, U.S. patent application Ser. No. 13/860,474 entitled "METHOD AND SYSTEM FOR MAGNETIC ACTUATED MIXING TO PREPARE LATEX EMULSION" to Yu Liu et al., filed Apr. 10, 2013.

BACKGROUND

The presently disclosed embodiments relate generally to an in-situ method to prevent pigmented ink from settling in long running-time environments as well as environments where the ink jet printer is in a standby mode. Micro-magnetic particles are introduced into an ink reservoir and/or an ink passageway and a tunable magnetic field is generated which results in an establishment of chaotic motion of the micro-magnetic particles throughout the ink mixture and a better dispersed ink product.

Uniform and homogeneous pigmented ink is known to suffer from becoming heavily layered mixture due to ink "settling" upon the passage of time. The ink "settling" yield unacceptable defects on image density. The ink "settling" yields unacceptable defects in the printer hardware, such as clogging of jetting nozzles. Accordingly, stable pigment dispersion in ink is always required in ink jet printing.

Dispersant is used to provide a chemical solution to the pigment dispersion issue in ink. The use of pigment dispersants, although practiced in the community to prompt pigment dispersion, is not favorable due to its negative impact on ink flowability and drop formation during the jetting process. It is a passive method to deal with ink "settling." Dispersants are still challenging to become an effective solution for longer life. At present, an amount of physical solutions have been widely practiced.

There are physical or mechanical solutions that are widely practiced. These mechanical solutions include stir bars, raised fluid exits and pumping assemblies. For example, U.S. Pat. No. 7,643,776 describes these mechanical solutions.

However, none of these solutions come with an economical advantage, an acceptable relief of system integration (design, manufacturing and use), and performance maximization. Performance maximization means that there is less material waste and higher efficiency.

Accordingly, a need exists for a system to be developed that prevents ink from settling and keeps the ink having uniform dispersion during a long running time. More specifically, a need exits to develop an effective and continual mixing method that is low cost, highly effective, compact in size and results in high flexibility.

Further, there remains a need to develop a dispersion technology which reduces processing time and cost, without sacrificing benchmark material properties (e.g., small size and narrow particle size distribution).

SUMMARY OF THE INVENTION

In embodiments of the invention, there is a method for preparing a pigment-containing ink composition comprising adding a pigment or a pre-dispersion of a pigment, a surfactant, and a solvent into an ink reservoir to form an ink mixture, adding magnetic particles, and applying a varying magnetic field to the ink reservoir to create a chaotic motion of the magnetic particles throughout the ink mixture to form the pigment-containing ink composition. The method may also include adding a dispersion of a binder resin into the ink reservoir to form the ink mixture. The magnetic particles may have a particle size from about 500 nm to about 50 micrometers. The pigment-containing ink composition is a water-based ink composition. The pigment has a density of at least 2.0 grams/$cm^3$. The pigment in the ink composition has a particle size less than 500 nm.

In embodiments of the invention, an ink jet printing system comprises an ink reservoir, an ink passageway, an inkjet nozzle, and a plurality of magnetic elements that are located adjacent at least one of the ink reservoir and the ink passageway. The at least one of the ink reservoir and the ink passageway further includes having micro-magnetic particles located therein. The magnetic particles may have a particle size from about 500 nm to about 50 micron. The ink reservoir and ink passageway further contain ink composition comprising pigment colorant. The plurality of magnetic elements provide a magnetic field to be applied to the micro-magnetic particles which results in a chaotic motion of the magnetic particles in the ink mixture.

In embodiments of the invention, there is a method to prevent settlement of an ink composition in an at least one of an ink reservoir and an ink passageway of a printing system comprising providing a plurality of magnetic elements, locating the plurality of magnetic elements adjacent to at least one of the ink reservoir and the ink passageway within the printing system, adding magnetic particles into at least one of the ink reservoir and the ink passageway; and creating a chaotic motion of the magnetic particles in the ink composition in at least one of the ink reservoir and the ink passageway using the plurality of magnetic elements. The ink composition is a water-based ink composition comprising pigment colorant. The ink composition is a metal nanoparticle based ink composition. The pigment has a density at least 2.0 g/$cm^3$. The magnetic particles have a particle size from about 500 nm to about 50 micron. The pigment has a particle size less than 500 nm. The kinetic energy of the chaotic motion of the magnetic particles is larger than the potential energy of the pigment particles.

BRIEF DESCRIPTION OF THE DRAWINGS

For a better understanding of the present embodiments, reference may be made to the accompanying figures.

DETAILED DESCRIPTION

Figure 1A:
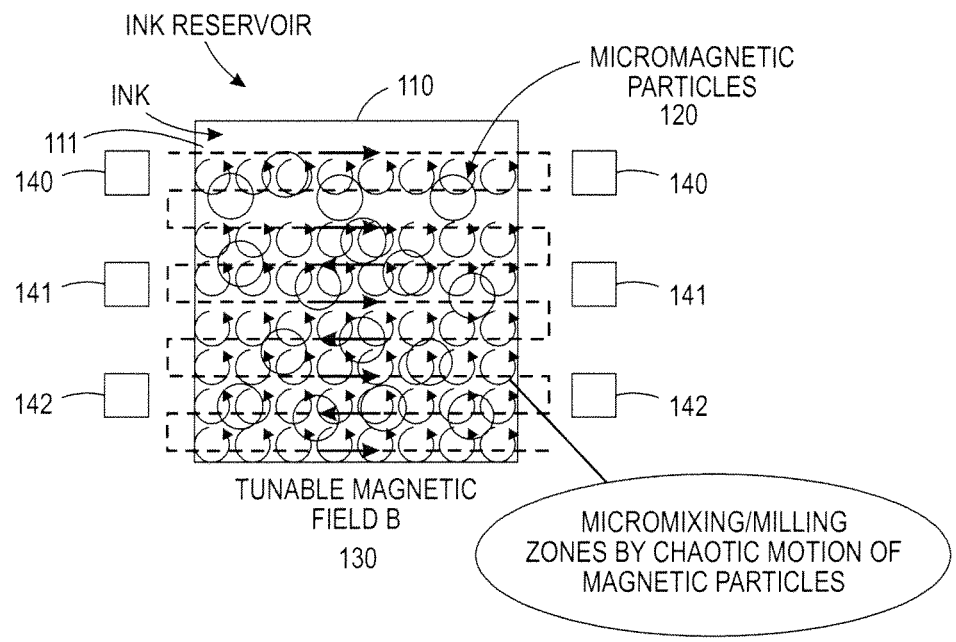
FIG. 1(a) illustrates an ink reservoir system that is mixed by chaotic motion of magnetic particles according to an embodiment of the invention.

In the following description, reference is made to the accompanying drawings, which form a part hereof and which illustrate several embodiments. It is understood that other embodiments may be utilized and structural and operational changes may be made without departure from the scope of the present disclosure. The same reference numerals are used to identify the same structure in different figures unless specified otherwise. The structures in the figures are not drawn according to their relative proportions and the drawings should not be interpreted as limiting the disclosure in size, relative size, or location.

A method is disclosed to introduce micro-size or nano-size magnetic particles into an ink storage chamber and to use a tunable magnetic field to drive these magnetic particles through chaotic motions throughout the entire ink mixture which results in an ink with well-posed dispersions. The system includes an ink reservoir, an ink passageway and an inkjet nozzle. The magnetic particles are introduced into the ink in the ink reservoir and a magnetic apparatus is either placed adjacent to the ink reservoir or adjacent to the ink passageway to tune the magnetic field and cause chaotic movement of the ink particles in the ink mixture. The ink particles are better dispersed as a result of this chaotic movement. This system has many advantages. The system has global mixing capability with a micro-scale enhancement of mixing efficiency. The system is low cost and has a flexible and compact system implementation. The system and method are environmentally friendly because the in-situ mixing may reduce the ink wastes. The system and method also extends the life-time of the print head and may potentially improve image quality.

This proposed method and system prevents ink from settling in long-term running environments and/or during periods of standby. Micro- or nano-size magnetic particles are introduced into an ink storage chamber or the ink passageway. A tunable electronic field is applied by electromagnets to drive these magnetic particles with chaotic motion throughout the whole mixture which results in well-posed mixing of the ink. When mixed with the ink, each micro-magnetic is an independent entity that provides or generates a micro-scale shearing field. Overall, the particle-particle and the particle-solution interaction at the micro level enhances the micro-zone chaotic motion in either the ink storage chamber, or the ink passageway, or both. When exposed to a cyclic magnetic field, these magnetic particles carry enough momentum to cause interaction with solutes in the ink (e.g., pigment particles) to create highly localized, but chaotic shearing forces. The localized mixing prevents the formation of any aggregates or settlements and as a result, the ink dispersion stays homogeneous over time. The introduction of the micro-magnetic particles results in the breakdown of aggregates within the ink. In embodiments of the invention, the micro-magnetic particles may be collected and extracted for cleaning and utilizing in future applications.

The invention may be utilized in an apparatus that can be used as an add-on component for current inkjet printers. The method may be utilized for special inks such as inks that utilized inorganic metal oxide pigments, or metal nanoparticle inks. Illustratively, inks that utilize $TiO_2$ as the pigment is likely to settle over time because $TiO_2$ has a high density around 4 grams/cm$^3$. The in-situ mixing of the present invention will prevent the settling of such heavy pigments.

Figure 1B:
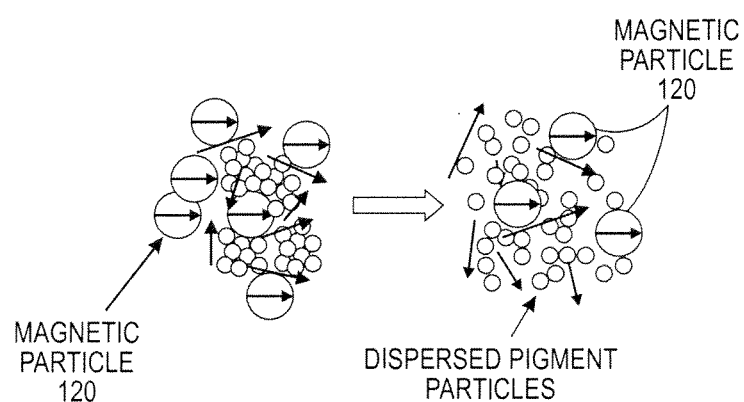
FIG. 1(b) illustrates magnetic particles and pigment particles before and after the application of the tunable magnetic field according to an embodiment of the invention.

FIG. 1(a) illustrates an ink reservoir system that is mixed by chaotic motion of magnetic particles according to an embodiment of the invention. FIG. 1(a) illustrates an ink reservoir 110, an ink composition 111, micro-magnetic particles 120, and a plurality of magnetic elements. In an embodiment of the invention, such as the embodiment illustrated in FIG. 1(a), the plurality of magnetic elements may be pairs of electromagnets 140 141 142. The ink composition 111 is placed or loaded into in an ink reservoir 110. Micro-magnetic particles 120 may be added to the ink composition 111 in the ink reservoir 110. In an embodiment of the invention, the pairs of electromagnets 140 141 142 are placed adjacent to the ink reservoir 110. In an embodiment of the invention, the pairs of electromagnets 140 141 142 are attached to the ink reservoir. A current is applied to the electromagnets 140 141 142. A magnetic field (referred to as a tunable magnetic field) is created by the application of the current to the electromagnet pairs 140 141 142. This results in chaotic motion of the magnetic particles which results in the micro-mixing of the ink composition 111 in the ink reservoir 110. FIG. 1(b) illustrates magnetic particles and pigment particles before and after the application of the tunable magnetic field according to an embodiment of the invention. As is illustrated in the left-hand side of FIG. 1(b), before application of the magnetic field, the pigment particles are grouped together as are the micro-magnetic particles. After the tunable magnetic field is applied, the pigment particles are dispersed more uniformly as is illustrated in the right hand side of FIG. 1(b). The chaotic motion of the micro-magnetic particles has caused this pigment dispersion. The kinetic energy of the chaotic motion of the magnetic particles is larger than the potential energy of the pigment particles.

The magnetic particles may be comprised of paramagnetic, ferromagnetic, ferromagnetic or antiferromagnetic materials. The magnetic particles may further be comprised of a material selected from the group consisting of Fe, $Fe_2O_3$, Ni, $CrO_2$, Cs, and the like or mixtures thereof. In embodiments, the magnetic particles have a non-magnetic coating. In other embodiments, the magnetic particles can also be encapsulated with a shell, for example, a polymeric shell comprising, in embodiments, polystyrene, polyvinyl chloride, TEFLON®, PMMA, and the like and mixtures thereof.

The magnetic particles may have a diameter or particle size of from about 500 nm to about 50 μm. In other embodiments of the invention, the magnetic particles may have a diameter or particle size of from about 1 to about 25 microns, or from about 1 to about 10 microns. The volume percentage of magnetic particles can be chosen based on different applications or processes. In embodiments, the volume percentage of magnetic particles used for milling may also vary depending on the different application or process for which the pigment particles are being used. For example, from about 5% to about 80% magnetic particles may be added to the vessel. The magnetic field may have strength of from about 500 Gauss to about 50,000 Gauss.

The ink composition may be a pigment-containing ink composition. The pigment-containing ink composition may be a water-based ink composition. The pigment or pigment colorant in the pigment-containing ink composition may have a density of at least 2.0 grams per cm$^3$. In other embodiments of the invention, the pigment or pigment colorant in the pigment-containing ink composition may have a density of at least 2.5 or of at least 3.0 grams per cm$^3$. Further, the pigment in the ink composition may have a particle size of less than 600 nanometers. In other embodiments of the invention, the pigment of the ink composition may have a particle size of less than 500 nm, or less than 300 nm. The pigment-containing ink composition may include pigment colorant.

In an embodiment of the invention, the pigment-based ink composition may include a dispersion of a binder resin that is added to the ink reservoir to form the pigment-containing ink composition. For water-based ink, the binder resin is dispersed as latex. Example binder resins include styrene-based resin, acrylates, polyester resin, polyurethane, polycarbonate, polyamide, polyimide, and the like.

In other embodiments, the ink is a metal nanoparticle ink, for example silver nanoparticle ink, gold nanoparticle ink, or copper nanoparticle ink. These metal nanoparticle inks usually have a high density, especially at high metal loading. In an embodiment of the invention, the metal nanoparticle inks may have a metal content of 30% by weight. In other embodiments of the invention, the metal nanoparticle inks may have a metal content of greater than 40% by weight, or greater than 50% by weight. In terms of density of the metal nanoparticle inks, the inks may have a density of greater than 1.5 grams/cm3, or greater than 1.8 grams/cm3, or greater than 2.0 grams/cm3. The metal nanoparticle can be treated as a type of pigment.

Figure 2:
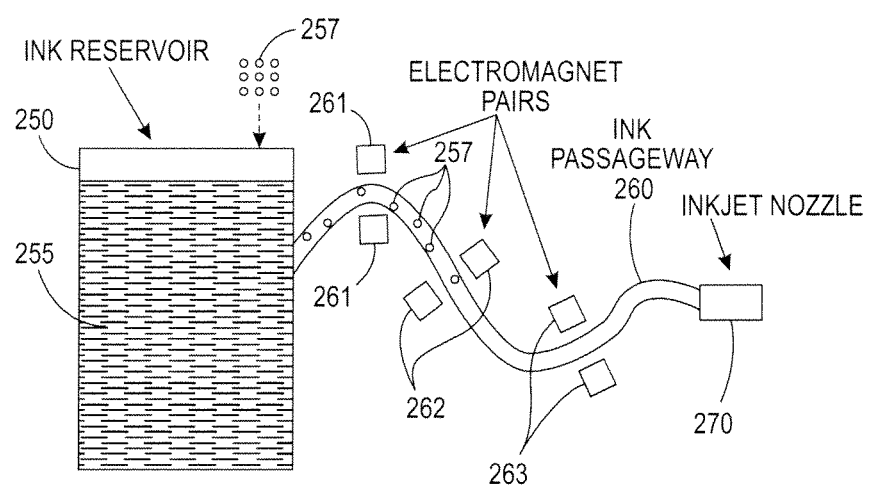
FIG. 2 illustrates an ink reservoir, an ink passageway and an inkjet nozzle according to an embodiment of the invention.

FIG. 2 illustrates an ink reservoir, an ink passageway and an inkjet nozzle according to an embodiment of the invention. In this embodiment of the invention, an ink jet printing system includes an ink reservoir 250, an ink composition 255, a plurality of micro-magnetic particles 257, an ink passageway 260, and a plurality of magnetic elements 261 262 263, and an ink jet nozzle 270. The plurality of magnetic elements 261 262 263 may be electromagnetic pairs. The ink jet printing system includes a plurality of the reservoirs, passageways, electromagnets and nozzles but only one is shown to more clearly illustrate the invention.

In the embodiment of the invention, the ink composition 255 is placed in an ink reservoir 255. In an embodiment of the invention, micro-magnetic particles 257 may be added to the ink composition in the ink reservoir 255. The ink composition 255 may be transferred or jetted to the ink nozzle 270 via the ink passageway 260. In an embodiment of the invention, micro-magnetic particles 257 may be added to the ink composition in the ink passageway 260. This additional of micro-magnetic particles may be the only addition of micro-magnetic particles or may be in addition to micro-magnetic particles introduced into the ink composition in the ink reservoir. A plurality of magnetic elements 261 262 263 may be placed adjacent to the ink passageway 260. In the embodiment of the invention illustrated in FIG. 2, the plurality of magnetic elements 261 262 263 may be pairs of electromagnets. One of each of the pairs of electromagnets 261 262 263 are placed are placed on opposite sides on the ink passageway 260 from the other side of the pairs 261 262 263. In an embodiment of the invention, the pairs of electromagnets 261 262 263 may be attached to the ink passageway 260. Current is applied to the pairs of electromagnets 261 262 263 to generate a tunable electromagnetic field around the ink passageway 260. The tunable electromagnetic filed causes chaotic motion of the micro-magnetic particles 257 that have been placed in the ink composition 255. The chaotic motion, in the embodiment of the invention illustrated in FIG. 2, occurs in the ink passageway. The chaotic motion of the micro-magnetic particles leads to better pigment dispersion in the ink passageway 260 and then the ink jet nozzle 270.

Figure 3A:
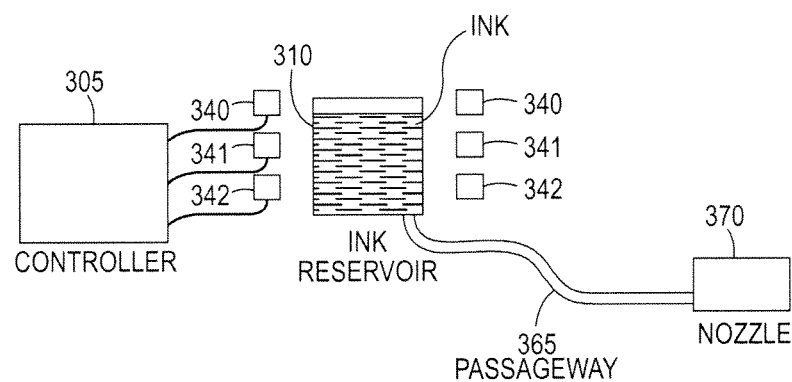
FIG. 3(a) illustrates an inkjet system including micro-magnetic particles, electromagnets near an ink reservoir and a controller according to an embodiment of the invention.

FIG. 3(a) illustrates an inkjet system including micro-magnetic particles, a plurality of magnetic elements near an ink reservoir and a controller according to an embodiment of the invention. In the embodiment of the invention illustrated in FIG. 3(a), the plurality of magnetic elements may be pairs of electromagnets although other configurations may be used. In the embodiment illustrated in FIG. 3(a), the inkjet system includes a controller 305, an ink composition, an ink reservoir 310, an ink passageway 365, an ink jet nozzle 370 and a plurality of pairs of electromagnets 340 341 342. The micro-magnetic particles (not shown) are placed in the ink composition, which is located in the ink reservoir 310. The plurality of pairs of electromagnets 340 341 342 may be placed adjacent to the ink reservoir 310. In an embodiment of the invention, the plurality of pairs of electromagnets 340 341 342 may be attached to the ink reservoir 310. The controller 305 receives instructions and generates a signal which transmits or supplies current to the plurality of pairs of electromagnets 340 341 342. The plurality of pairs of electromagnets 340 341 342 generate a tunable or cyclic magnetic field and, in response, the magnetic particles carry enough momentum interacting with the pigment particles to create localized mixing utilizing chaotic shearing forces. The localized mixing prevents the formation of aggregates and settlements in the ink. Accordingly, the result is a well-dispersed ink composition that is then sent through the ink passageway 365 to the ink jet nozzle 370.

Figure 3B:
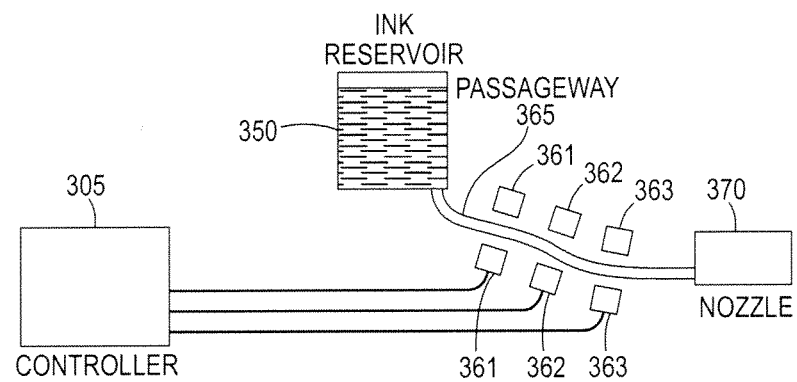
FIG. 3(b) illustrates an inkjet system including micro-magnetic particles, electromagnets near an ink passageway and a controller according to an embodiment of the invention.

FIG. 3(b) illustrates an inkjet system including micro-magnetic particles, electromagnets near an ink passageway and a controller according to an embodiment of the invention. The inkjet system includes a controller 305, an ink composition, an ink reservoir 350, an ink passageway 365, an ink jet nozzle 370 and a plurality of magnetic elements. In the embodiment of the invention illustrated in FIG. 3(b), the plurality of magnetic elements are pairs of electromagnets 361 362 363 although additional types of magnetic elements may be used. In the embodiment of the invention illustrated in FIG. 3(b), the plurality of pairs of electromagnets 361 362 363 are positioned adjacent to the ink passageway 365. In an embodiment of the invention, one of each of the pairs of electromagnets is placed on one side of the ink passageway 365 and the other one of each of the pairs is placed on the opposite side of the ink passageway 365. In an embodiment of the invention, the pairs of electromagnets 361 362 363 may be attached to the ink passageway 365. The micro-magnetic particles (not shown) may be placed in the ink composition when the ink composition is in the ink passageway 365. In an alternative embodiment of the invention, the micro-magnetic particles (not shown) may be placed in the ink composition, which may be located in the ink reservoir 350. The controller 305 receives instructions and generates a signal which transmits current to the plurality of pairs of electromagnets 361 362 363. The plurality of pairs of electromagnets 361 362 363 generate a tunable or cyclic magnetic field and, in response, the magnetic particles carry enough momentum interacting with the pigment particles to create localized mixing utilizing chaotic shearing forces. The localized mixing occurs in the ink passageway 365. The localized mixing prevents the formation of aggregates and settlements in the ink composition. Accordingly, the result is a well-dispersed ink composition that is then sent to the ink jet nozzle 370.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

The embodiments will be described in further detail with reference to the following examples and comparative examples. All the "parts" and "%" used herein mean parts by weight and % by weight unless otherwise specified.

Comparative Example

Example

Figure 4A:
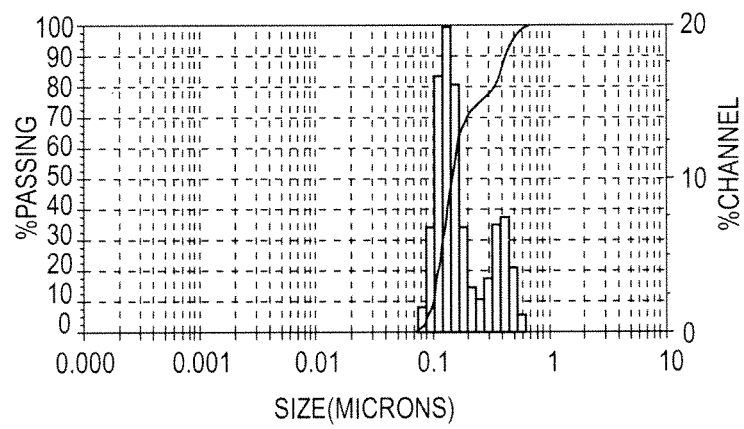
FIG. 4(a) illustrates particle distribution before introducing a mixing method of the present invention.
Figure 4B:
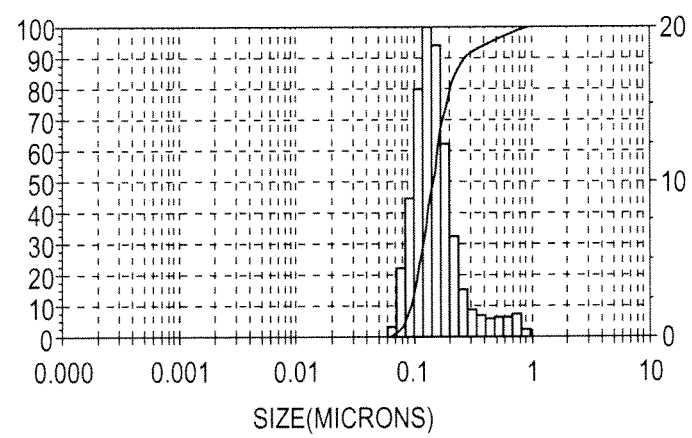
FIG. 4(b) illustrates particle distribution after introduction of the mixing method of the present invention.

This example was prepared with the magnetic actuated milling of the present embodiments. Into a 15 ml vial was added 0.5 g of carbon black pigment powder REGAL 330®, 5 g of DIW, and 0.24 g (18.75 wt %) Tayca power aqueous solution. Thereafter, 0.52 g of micro magnetic particles (Carbonyl Iron Powder from Royalink Industries Corp., average particle size about 4 to 5 µm) was introduced. In this example, a permanent magnet was manually moved up and down to provide a cyclic magnetic field. The cyclic frequency is about 1 Hz and total about 50 cycles were used. Finally, micro magnetic particles were attracted and collected by magnet before sending the sample for analysis. FIG. 4(a) illustrates particle distribution before introducing a mixing method of the present invention. FIG. 4(b) illustrates particle distribution after introduction of the mixing method of the present invention. The particle size of pigment was measured as shown in FIGS. 4(a) and (b).

As can be seen from FIGS. 4(a) and (b), both size reduction and uniformity was significantly increased with the present embodiments. More specifically, the figures show that without 1 minute of the magnetic actuating process, the pigment particles show bimodal distribution with about 24% of pigment particles having average particles about 417 nm, while with magnetic mixing/milling, the pigment particles is mono distributed with average particle size of 143.7 nm<150 nm.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for preparing a pigment-containing ink composition, comprising:
    a) adding a pigment or a pre-dispersion of a pigment, a surfactant, and a solvent into at least one of an ink reservoir and ink passageway to form an ink mixture;
    b) adding magnetic particles into at least one of the ink reservoir and the ink passageway; and
    c) applying a varying magnetic field to the ink reservoir by positioning a plurality of magnetic elements adjacent to the reservoir and ink passageway to create a chaotic motion of the magnetic particles throughout the ink mixture to form the pigment-containing ink composition.

2. The method of claim 1, further comprising adding a dispersion of a binder resin into the ink reservoir to form the ink mixture.

3. The method of claim 1, wherein the magnetic particles have a particle size from about 500 nm to about 50 micrometers.

4. The method of claim 1, wherein the pigment-containing ink composition is a water-based ink composition.

5. The method of claim 1, wherein the pigment has a density at least 2.0 grams/cm$^3$.

6. The method of claim 1, wherein the pigment in the ink composition has a particle size less than 500 nm.

7. The method of claim 1, further including moving the ink mixture through an ink passageway and applying of a magnetic field to the ink passageway by positioning pairs of magnetic elements adjacent to the ink passageway.

8. An ink jet printing system, comprising:
    an ink reservoir;
    an ink passageway;
    an inkjet nozzle; and
    a plurality of magnetic elements that are located adjacent at least one of the ink reservoir and the ink passageway, wherein the at least one of the ink reservoir and the ink passageway further includes having an ink composition and micro-magnetic particles located therein and the plurality of magnetic elements provide a magnetic field to be applied to the micro-magnetic particles which results in a chaotic motion of the magnetic particles in the ink mixture.

9. The system of claim 8, wherein the magnetic particles have a particle size from about 500 nm to about 50 micron.

10. The system of claim 8, wherein the ink reservoir and ink passageway further contain ink composition comprising pigment colorant.

11. The system of claim 10, wherein the pigment colorant has a density at least 2.0 g/cm$^3$.

12. The system of claim 8, wherein the kinetic energy of the chaotic motion of the magnetic particles are larger than the potential energy of the pigment particles.

13. A method to prevent settlement of an ink composition in an at least one of an ink reservoir and an ink passageway of a printing system comprising:
    providing a plurality of magnetic elements;
    locating the plurality of magnetic elements adjacent to at least one of the ink reservoir and the ink passageway within the printing system;
    adding magnetic particles into at least one of the ink reservoir and the ink passageway; and
    creating a chaotic motion of the magnetic particles in the ink composition in at least one of the ink reservoir and the ink passageway using the plurality of magnetic elements.

14. The method of claim 13, wherein the ink composition is a water-based ink composition comprising pigment colorant.

15. The method of claim 13, wherein the ink composition is a metal nanoparticle based ink composition.

16. The method of claim 14, wherein the pigment has a density at least 2.0 g/cm3.

17. The method of claim 13, wherein the magnetic particles have a particle size from about 500 nm to about 50 micron.

18. The method of claim 13, wherein the kinetic energy of the chaotic motion of the magnetic particles are larger than the potential energy of the pigment particles.

19. The method of claim 13, wherein the pigment has a particle size less than 500 nm.

* * * * *